(12) United States Patent
Schiltz

(10) Patent No.: US 6,887,379 B2
(45) Date of Patent: May 3, 2005

(54) MULTIPLE USE WATER PURIFICATION DEVICE

(76) Inventor: Beryl B. Schiltz, 5652 Magnolia Run Cir., #107, Virginia Beach, VA (US) 23464

( * ) Notice: Subject to any disclaimer, the term of this patent is extended or adjusted under 35 U.S.C. 154(b) by 0 days.

(21) Appl. No.: 10/628,182

(22) Filed: Jul. 28, 2003

(65) Prior Publication Data

US 2004/0140267 A1 Jul. 22, 2004

Related U.S. Application Data

(63) Continuation-in-part of application No. 09/625,250, filed on Jul. 25, 2000, now abandoned.

(51) Int. Cl.[7] .................................................. C02F 9/00
(52) U.S. Cl. ........................ 210/266; 210/282; 210/283; 210/287
(58) Field of Search ................................. 210/668, 669, 210/694, 266, 282, 283, 284, 287, 290

(56) References Cited

U.S. PATENT DOCUMENTS

| | | | | |
|---|---|---|---|---|
| 2,389,185 A | * | 11/1945 | Dick ........................... | 210/472 |
| 3,327,859 A | * | 6/1967 | Pall ............................ | 210/266 |
| 3,335,917 A | * | 8/1967 | Knight ................... | 222/189.07 |
| 3,817,860 A | * | 6/1974 | Lambert et al. ............. | 210/753 |
| 4,298,475 A | * | 11/1981 | Gartner ....................... | 210/266 |
| 4,714,550 A | * | 12/1987 | Malson et al. .............. | 210/244 |
| 4,769,143 A | * | 9/1988 | Deutsch et al. ............. | 210/266 |
| 4,995,976 A | * | 2/1991 | Vermes et al. .............. | 210/266 |
| 5,167,819 A | * | 12/1992 | Iana et al. ................... | 210/474 |
| 5,415,774 A | * | 5/1995 | Cowan et al. .............. | 210/266 |
| 5,456,831 A | * | 10/1995 | Sullivan ...................... | 210/266 |

\* cited by examiner

*Primary Examiner*—Ivars C. Cintins
(74) *Attorney, Agent, or Firm*—Seto Patents; Jeffrey K. Seto

(57) ABSTRACT

A water purification device that can be inserted into a canteen full of impure water that allows a user to drink purified water directly from the canteen, without the need of a pump. The canteen insert is a multistage purification device that has an inlet section at one end and a canteen insert flange mouthpiece at the other end. After the present purification device has been inserted in the canteen, the user tips the bottom of the canteen upward, holding the flange mouthpiece to their mouth and squeezes gently on the sides of the canteen. This forced gravity action pushes water sequentially through the multiple purification sections of the preferred embodiment and subsequently out of the flange mouthpiece for consumption by the user. The canteen flange mouthpiece can also be replaced by a flute straw mouthpiece that allows the user to withdraw water from the canteen via the straw. The same multiple water purification stages are also used in a straw and an inline purifier embodiment.

5 Claims, 3 Drawing Sheets

MULTIPLE USE WATER PURIFICATION DEVICE

BACKGROUND OF THE INVENTION

This application is a continuation-in-part of application Ser. No. 09/625,250 filed on Jul. 25, 2000, now abandoned.

BACKGROUND OF THE INVENTION

The present invention is related generally to the field of water purification and more specifically to a water purification device that can be inserted into a canteen that was filled from an impure water source and immediately allows the user to consume clean water directly from the canteen, without the need of a pump.

Campers, survivalists and military personnel all understand the importance of maintaining, or having access to, sufficient quantities of water when they are out in the wilderness and away from traditional clean water sources. The average human being, when stranded outside in the elements, cannot survive much longer than three days without water to drink. Unfortunately, water is one of the heaviest commodities that backpackers and military personnel must carry with them if they don't have access to a clean water source. This undeniable need for clean water coupled with the relatively unmanageable weight of water makes the ability to purify water out "in the field" quite desirable.

When it comes to the military, purification of water "in the field" is a problem with which they are still struggling. For purifying large quantities of water a large and loud piece of electrical machinery known as a "ROWPU" (pronounced Row-Poo) Reverse Osmosis Purifying Unit, is used. One ROWPU can easily provide a company size unit or larger with all the water it required as long as there was a water source from which to draw. Unfortunately, this easy to use piece of machinery cannot be used in a tactical setting. The ROWPU requires an electrical energy source, thus requiring a gas powered generator as an accompanying piece of machinery. Clearly the bulk and weight of this machinery is already prohibitive for the smaller infantry units. Other intolerable characteristics of the ROWPU include the noise that is made while operating. In a tactical setting, letting a generator run would be like giving a map of exactly where you are to the enemy. Something all good leaders try to avoid. Another drawback of the ROWPU and of all large-scale water purification devices is that all of the troops have to come to one spot to get the clean water. Gathering all of the troops in one place or even allowing the troops to be counted while passing by an observer is another one of those things that good leaders try to avoid.

In order to avoid the above undesirable characteristics of large-scale water purification devices, the military implemented the use of Iodine tablets. This allowed water purification abilities to be distributed down to the individual soldier. While this did cure the larger scale purification problems, it created an entirely new list of "tablet" (Iodine or Chor-floc) problems. To begin with, treated water has poor palatability. Existing iodine tablets leave a residual disinfectant when used to disinfect an individual's field water supply. As a result, the water has a very strong iodine taste that makes it unpalatable to the soldier. Additionally, iodine tablets do not reduce turbidity in raw water supplies, which reduces the soldier's desire to drink water and thus risk possible dehydration. A further "tablet" drawback is their lengthy disinfection time. Iodine tablets and Chlor-floc require at least 30 minutes of disinfectant contact time to inactivate bacteria and viruses. Finally, since no filtration is provided when using tablets there is inadequate disinfection of protozoan cysts. Most protozoan cysts cannot be inactivated using iodine tablets or Chlor-floc. These organisms must be physically removed from raw water. Failure to do this could result in sickness due to waterborne diseases such as Crytosporidiosis and Giardiasis.

What is needed is a water purification device that has the advantages of both the large scale (ROWPU) and distributed (tablets) water purification devices and none of the drawbacks of either of the methods. The ideal purification device would be small enough to be distributed to the individual soldier. It would reduce turbidity, remove protozoan cysts and not make noise. And perhaps most importantly, it would provide palatable water to the troops without the undesirable "iodine" taste. The present invention is directed at providing a water purification device that meets all of these requirements. In operation, the present purification device will not require all of the troops to gather or pass by one location in order to get clean water. The device can easily be issued to each soldier at the same time their canteens are issued. The device also provides filtration that reduces turbidity and removes causes of waterborne diseases from raw water. This filtration is provided without a pump. Finally, because of the unique multistage purifying apparatus in the present purifying device, clean water is provided to the soldier without an undesirable iodine taste.

SUMMARY OF THE INVENTION

A water purification device that purifies water as the user drinks the water directly from the device. The purification device comprises an inlet section, a multi-stage purifying apparatus and an outlet section. The inlet section include a primary and a secondary filter for filtering high turbidity particles, bacteria and viruses larger than one micron out of the water. The inlet section also contains, inside the secondary filter, an iodized media for killing impurities and a scavenger media for removing residual iodine. Thus the inlet section filters the water and provides the first purification stage for the impure water before the water even enters the multi-stage purifying apparatus. The inlet section is separated by a separator from the multi-stage apparatus. The multi-stage apparatus is for destroying and removing impurities and improving the smell and taste of the water. The multi-stage apparatus comprises: a first water purification section containing a second dose of iodized media for killing impurities; a second water purification section containing a second scavenger media for removing residual iodine; a third water purification section containing granular activated charcoal for enhancing the smell and taste of the water; and a fourth water purification section containing a hepatrophic media, such as I-3, for disinfecting any backwash from the user. The final section of the water purification device is an outlet section that dispenses the purified water to the user. The outlet section and inlet section can be modified so that the device can be used as a canteen insert, an insert in a water line, and even as a straw.

BRIEF DESCRIPTION OF THE DRAWINGS

The invention of the present application will now be described in more detail with reference to the accompanying drawings, given(only by way of example, in which.

DETAILED DESCRIPTION OF THE INVENTION

Figure 1:
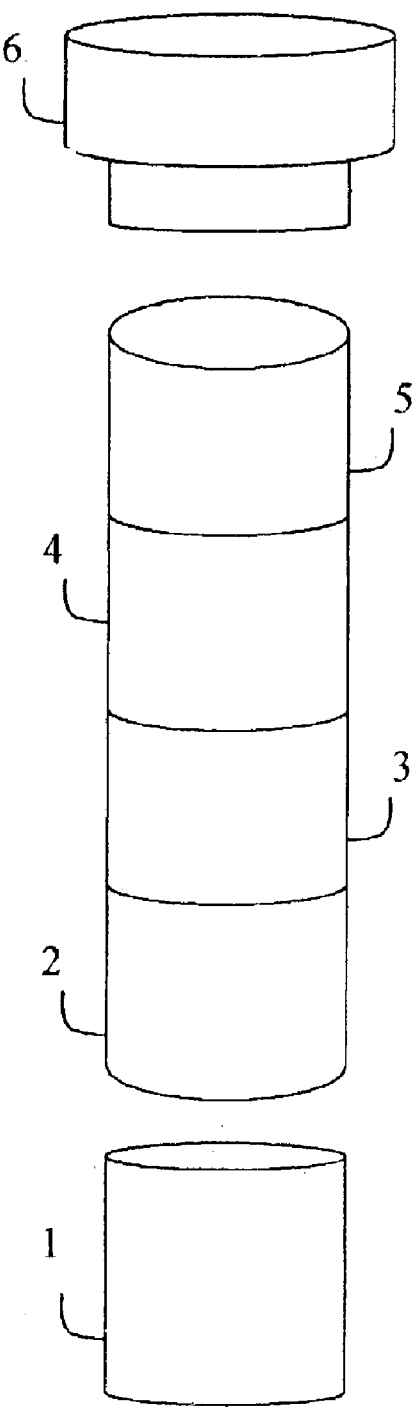
FIG. 1 is a diagram of the preferred embodiment.

Referring to FIG. 1, water purification section 1 is the water inlet section and has a primary outer filter wrapped around a plastic tubing with inlet holes approximately 10–50 microns in size and a secondary 1 micron absolute filter inside the plastic tubing. Section 1 further contains an iodized purifying stage and an Iodine removal (scavenger) stage. Water purification section 1 is the water Inlet section for the preferred embodiment. Since inlet section 1 contains two stages of filters, an iodized resin and scavenger, the water is immediately subjected to the removal of high dense particles and also immediately introduced to an impurity killing media. In other words, water purification section 1 reduces the turbidity of the impure water and subjects the water to a first dose of purifying media. Water purification section 2 contains Iodinated media and subjects the filtered water to a second massive dose of purifying media Water purification section 3 includes a Scavenger, such as Ecosorb with Scavenger 331, for removing residual iodine, thus improving the taste of the water. Water purification section 4 includes Granular Activated Charcoal (GAC), that improves the smell and further improves the taste of the water. Water purification section 5 includes a Hepatrophic media, such as the iodine matrix known as I-3, that provides any required purification due to back wash from the user. Each water purification section is separated from the other sections by a polyester, cotton or poly-cotton mesh separator.

The preferred embodiment is distinguished from the other embodiments by canteen insert adapter 6. Water purification sections 1–5 are identical in each of the three embodiments. In operation, a canteen is filled directly from an impure water source such as a lake or stream. The preferred embodiment is then inserted into the full canteen. Canteen insert adapter 6 provides a water tight seal for canteens such as those issued by the U.S. military, for example. Of course, canteen insert adapter 6 can be made so that the preferred embodiment can be used in different canteens as well. Adapter 6 includes a flange, which is used as the mouthpiece so the user can drink purified water directly from the canteen via the flange mouthpiece. No pump is required. The user merely tilts the bottom of the canteen up while sipping from the flange mouthpiece and squeezes gently on the sides of the canteen. Alternatively, a straw can be used to suck purified water out of the canteen. Adapter 6 can include a straw adapter that allows attachment of an optional straw to the preferred embodiment. The preferred embodiment with the optional straw, operates in the same manner as a traditional straw.

Figure 2:
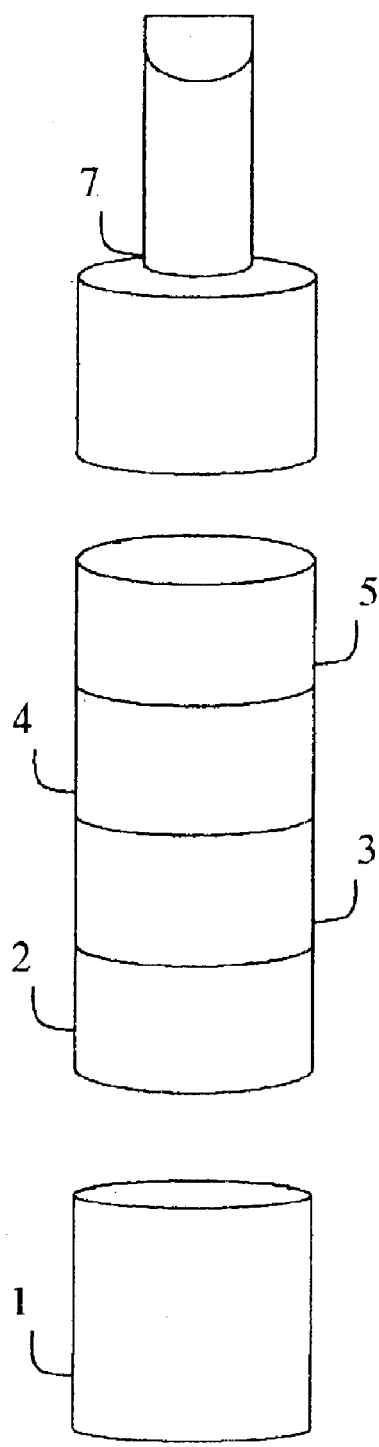
FIG. 2 is a diagram of an alternative embodiment.
Figure 3:
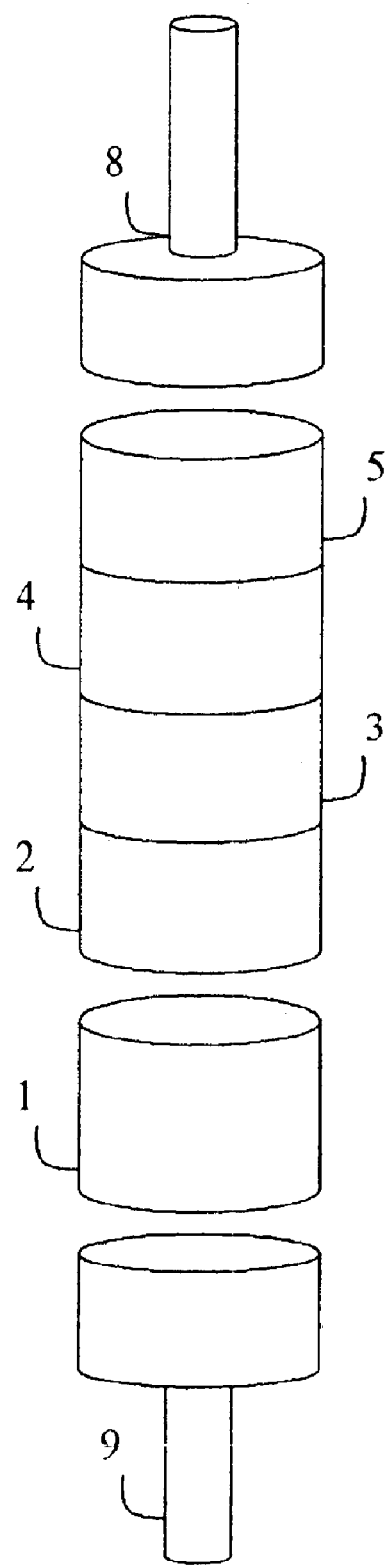
FIG. 3 is a diagram of another alternative embodiment.

As discussed above, water purification sections 1–5 are identical in the three embodiments, FIGS. 1–3 respectively. Further, each of the embodiments may be used as disposable units, wherein when a maximum amount of water has been purified or one of the filters becomes clogged, the user simply throws the entire embodiment away and begins to use a new unit.

Referring to FIG. 2, the first alternative embodiment is shown. This embodiment is best described as a flute straw that can be inserted directly into an impure water source and allows a user to suck purified water through the opposite end of the straw. The flute straw mouthpiece 7 is placed in the mouth of the user and through suction the user draws water into section 1 and through the adjoining purification sections 2–5. This embodiment provides a small and extremely portable purifying water device. It further allows the flexibility of purifying water without any container being used. In an extreme situation all three devices can be used as a straw would be used. As shown in FIG. 2, flute straw mouthpiece 7 has a cross-sectional shape of the letter "D". This "D" shape provides structural integrity to the straw and helps prevent the straw from collapsing inward when suction is applied thereto by the user.

FIG. 3 shows the third embodiment of the present invention. Again, water purification sections 1–5 are identical those described above. Water line insert sections 8 and 9 allow this embodiment to be inserted in a water line that connects a water source to a dispensing source or mouthpiece. The third embodiment may be used in what is known in the U.S. military as a camel-back, a water bag that is worn like a backpack and has a water line that extends from the water bag to the mouth of the user. In operation, a water line will be equipped with adapters that allow insertion of insert sections 8 and 9 into the flow-of the water line, with the impure water entering section 9 and exiting section 8 to continue to the mouth of the user. Depending on the design of the water line in which the device is inserted, one of the insert sections 8 or 9 may take the shape of a female type insert, vice the male type insert that is shown in FIG. 3. The only change in water purification sections in this embodiment is the realignment of the primary and secondary filters in section 1 so as to compensate for water entering only one side, the base, of section 1 in this embodiment. The embodiment of FIG. 3 may be referred to as an "inline" embodiment, because the water purification device is inserted within the water supply line.

As discussed above, each embodiment may be used as a single disposable unit. When any of the above embodiments becomes no longer useful, the user may throw away the entire embodiment and open a new unit-that comes complete with all sections shown in the respective Figures. Each of the preferred embodiments comes with its own canteen insert adapter 6 that includes a mouthpiece for directly dispensing water to the user and/or a straw adapter that allows the use of a straw to get water from the canteen. Each straw unit, FIG. 2, comes with its own straw mouthpiece 7. And each water line unit, FIG. 3, comes with both water line inserts 8 and 9. The user does not need to save any sections from the old water purification unit, making each unit disposable.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A water purification device that purifies water as a user drinks or sucks the water through the device, the purification device comprising:

an inlet section with primary and secondary filters for removing turbid impurities, bacteria and viruses larger than one micron wherein,
the secondary filter includes an iodized media for killing impurities and a scavenger media for removing residual iodine;

a multi-stage purifying apparatus, comprising:
a first water purification section containing a second iodized media for killing impurities;
a second water purification section containing a second scavenger media for removing residual iodine;
a third water purification section containing granular activated charcoal for enhancing smell and taste of the water; and a fourth water purification section containing a hepatrophic media for disinfecting any backwash from the user;

and; an outlet section that dispenses the purified water to the user; wherein a separator is provided between the inlet section and the multi-stage purifying apparatus, and a mesh separator is provided between each section of the multi-stage purifying apparatus.

2. The water purification device of claim 1 wherein, the outlet section is a canteen insert adapter that provides a water tight seal when the purification device is inserted into the neck of a canteen, the canteen insert adapter comprising a flange mouthpiece for dispensing purified water directly to the user.

3. The water purification device of claim 2 wherein, the canteen insert adapter further comprises a straw adapter for attachment of a flute straw that may be used to deliver the purified water to the user.

4. The water purification device of claim 1 wherein, the outlet section includes a flute straw mouthpiece that is in the general shape of a D, the D-shaped straw mouthpiece allowing the user to use the purification device in the same manner as a traditional straw by submerging the inlet section of the purification device in an impure water source and providing suction at the mouthpiece to purify and consume the water.

5. The water purification device of claim 1 wherein the device is used as an inline purifier in a water line, wherein:

the inlet section is arranged so that water enters only through its base surface area and the inlet section further comprises a water source inlet portion that is inserted into the water line and receives impure water; and the outlet section is inserted into the water line portion that leads to the user's mouth and passes purified water into the water line.

\* \* \* \* \*